United States Patent
Bonvicini

(12) 
(10) Patent No.: US 7,324,925 B2
(45) Date of Patent: Jan. 29, 2008

(54) METHOD OF INFORMATION ANALYSIS

(76) Inventor: Giovanni Bonvicini, 31515 Grove, Livonia, MI (US) 48154

(*) Notice: Subject to any disclaimer, the term of this patent is extended or adjusted under 35 U.S.C. 154(b) by 88 days.

(21) Appl. No.: 11/416,680

(22) Filed: May 3, 2006

(65) Prior Publication Data

US 2006/0253267 A1 Nov. 9, 2006

Related U.S. Application Data

(60) Provisional application No. 60/677,748, filed on May 4, 2005.

(51) Int. Cl.
*G06F 19/00* (2006.01)
*G06F 17/18* (2006.01)

(52) U.S. Cl. .................. 702/189; 702/179; 702/181

(58) Field of Classification Search ............. 324/602, 324/605, 606; 702/127, 150, 151, 152, 153, 702/154, 179, 181, 189

See application file for complete search history.

(56) References Cited

U.S. PATENT DOCUMENTS

| | | | | |
|---|---|---|---|---|
| 3,348,031 | A * | 10/1967 | Bates et al. ................ | 702/180 |
| 5,732,551 | A * | 3/1998 | Naber et al. ............... | 60/274 |
| 6,975,964 | B2 * | 12/2005 | Reichler et al. ........... | 702/182 |
| 7,003,430 | B2 | 2/2006 | Wang et al. | |
| 7,016,786 | B1 | 3/2006 | Ranganathan et al. | |
| 2005/0087558 | A1 * | 4/2005 | Reichler et al. ........... | 222/251 |
| 2006/0253267 | A1 * | 11/2006 | Bonvicini ................... | 702/181 |

OTHER PUBLICATIONS

IBM Technical Disclosure Bulletin: "Algorithm for Measuring the Probability of Infrequent Events", Feb. 1, 1991, vol. 33, No. 9, pp. 184-190.*
Maximal information analysis: I-various Wayne state plots and the most common likelihood principle; G. Bonvicini, Physics Department, Wayne State University; Jun. 14, 2005.

* cited by examiner

*Primary Examiner*—Edward Cosimano
(74) *Attorney, Agent, or Firm*—Gifford, Krass, Sprinkle, Anderson & Citkowski, P.C.

(57) ABSTRACT

The present invention is directed to a method for information analysis used to discriminate between biased and unbiased fits. A goodness-of-fit parameter becomes a quantity of interest for analysis of multiple measurements and does so by replacing a likelihood function with a probability of the likelihood function $W(L|\alpha)$. The probability of the likelihood function is derived from a new posterior probability $P(\alpha|L)$ and the goodness-of-fit parameter G, wherein a is a set of fitting parameters, L is the likelihood function and $W(L|\alpha)$ is equal to the product of $P(\alpha|L)$ and G. Furthermore, if substantial prior information is available on α, then the probability of the fitting parameters $P(\alpha)$ can is used to aid in the determination of $W(L|\alpha)$.

19 Claims, 4 Drawing Sheets

METHOD OF INFORMATION ANALYSIS

RELATED APPLICATION

This patent application claims priority to provisional application U.S. Ser. No. 60/677,748 filed May 4, 2005, now expired.

FIELD OF THE INVENTION

The present invention in general relates to statistical analysis of data and in particular to the statistical analysis of biased and unbiased data.

BACKGROUND OF THE INVENTION

Statistics is a mathematical science related to the collection, analysis, interpretation and presentation of data. It has a wide range of applications from the physical and social sciences to the humanities, as well as to business, government, medicine and other various industries. A common goal for most statistical analysis operations is to investigate causality, and in particular to draw conclusions on the effect of various changes to the values of predictors or independent values on a response or dependent variable. If a sample of the total population of data is representative of the population, then inferences and conclusions made from a statistical analysis of the sample can be extended to the entire population as a whole. Furthermore, statistics offers methods to estimate and correct for randomness in the sample and in the data collection procedure. The fundamental mathematical concept employed in understanding such randomness is probability.

A probability distribution is a function that assigns probabilities to given events or propositions. There are several equivalent ways to specify a probability distribution, for example to specify a probability density function or specify a moment. In addition to a probability distribution, a statistics analysis can include the likelihood principle which asserts that all of the information in a sample is contained in a likelihood function.

A typical statistical analysis performed using the likelihood principle uses a binned likelihood function, which is obtained by taking the product of the probabilities for each ordinate data point y, as a function of the fitting parameter(s) $\alpha$ and the abscissa value(s) x as shown in the following equation:

$$L(y|\alpha) = \Pi_j P(y_j, \alpha, x_j) \quad (1)$$

wherein file index j runs over the data set (x,y) of dimension M. The probability $P(y|\alpha,x)$ is a function of two entities: the fitting function $f(\alpha,x)$), hereafter known as $f_j$, and the statistical function that predicts how the gate data will distribute around f, hereafter called the statistics. In the case of Gaussian statistics, for example, the likelihood reads:

$$L(y|\alpha) = \prod_j \frac{1}{\sqrt{2\pi}\sigma_j} \exp\left(-\frac{1}{2}\frac{(y_j - f_j)^2}{\sigma_j^2}\right) \quad (2)$$

A standard treatment may involve the maximization of $L(y|\alpha)$ according to the frequenting method, or equivalently the maximization of its logarithm. Finding the maximum of $L(y|\alpha)$ or its logarithm will return a set $\mu$ which estimates the unknown set $\alpha$. Alternatively, the first moments of the likelihood can be used as an estimator for $\alpha$.

A set of variances D describe the variance of each parameter $\alpha$. Often D is defined as $\sigma^2$ in the literature with the result of a measurement given as $\alpha \pm \sigma$. More comprehensively, the set of variances D is related to the diagonal of the covariance matrix V, where the off-diagonal elements carry information regarding correlation between different fitting parameters. A covariant matrix can be defined as:

$$V_{ik} = -\frac{\partial^2 L}{\partial \alpha_i \partial \alpha_k} \quad (3)$$

with $$\frac{1}{D_i} = V_{ii} \quad (4)$$

Alternatively, one can derive the covariance matrix from second moments:

$$\frac{1}{V_{ik}} = \frac{\int d\alpha_i d\alpha_k L(y|\alpha)\alpha_i \alpha_k}{\int d\alpha_i d\alpha_k L(y|\alpha)} - \mu_i \mu_k \quad (5)$$

If fluctuations associated with data (x,y) are distributed according to a Gaussian probability distribution, then the statistics for the fit of the data are Gaussian. Likewise, if the fluctuations are distributed according to a Poissonian, multiracial or a rarer type of probability distribution, the statistics are described by the given distribution.

Regardless of matter which distribution is used, a goodness-of-fit parameter specifies how faithfully data are reproduced by a given fitting function. For example, in the case of using Gaussian statistics, the familiar $\chi^2$ defined as:

$$\chi^2 = -2 \ln L_{max} \quad (6)$$

provides information as to how well a Gaussian distribution fits the data.

Using a Bayesian framework, a fitting procedure is similar to the frequenting method, but the likelihood is related to the posterior probability $P(\alpha|y)$ via Bayes' theorem:

$$P(\alpha|y) = \frac{L(y|\alpha)P(\alpha)}{P(y)} \quad (7)$$

wherein the prior probability $P(\alpha)$ includes any prior information on the fit. Thereafter a similar procedure as used in the frequenting method, i.e. maximization, estimation of the uncertainty and estimation of goodness-to-fit, is applied to $P(\alpha|y)$. In the alternative, an estimation of goodness-to-fit is evaluated using the integral of the posterior probability $P(\alpha|y)$.

Whichever method is used, frequentist or Bayesian, it is important to note that in the vast majority of statistical analysis problems the difference in results obtained using either method is too small to be of practical consequence. However, there is a fundamental limitation in the methods presently used to statistically analyze data. This limitation is the inability of present methods to effectively identify biased data using current goodness-of-fit parameters.

This limitation is even greater when statistical analysis is used to combine several sets of data with all the sets measuring the same set of parameter(s) α. For example, data from clinical tests are partially or completing overlapping, with the main problem being in determining the exact weight to be given to each test in order to extract a more precise value of the parameter(s) being studied. Thus, current methods give data with significant bias the same weight as data with essentially no or very little bias. Therefore, there is a need for on improved method for information analysis.

BRIEF SUMMARY OF THE INVENTION

The present invention is directed to a method for information analysis. More particularly, a goodness-of-fit parameter is developed and used to discriminate between biased and unbiased fits. The goodness-of-fit parameter also becomes a quantity of interest for analysis of multiple measurements and does so by replacing a likelihood function with a probability of the likelihood function. The probability of the likelihood function can be expressed using the following equation:

$$P(\alpha \mid L) = \frac{W(L \mid \alpha)}{G} \quad (8)$$

wherein: W(L|α) is the probability of the likelihood, P(α|L) is the new posterior probability, G is the goodness-of-fit parameter, α is the set of fitting parameters, and L is the likelihood function. In addition, if substantial prior information is available on α, then the algorithm for determining the probability of the likelihood function can be expressed as:

$$P(\alpha \mid L) = \frac{W(L \mid \alpha)P(\alpha)}{G} \quad (9)$$

DETAILED DESCRIPTION OF THE INVENTION

Figure 1:
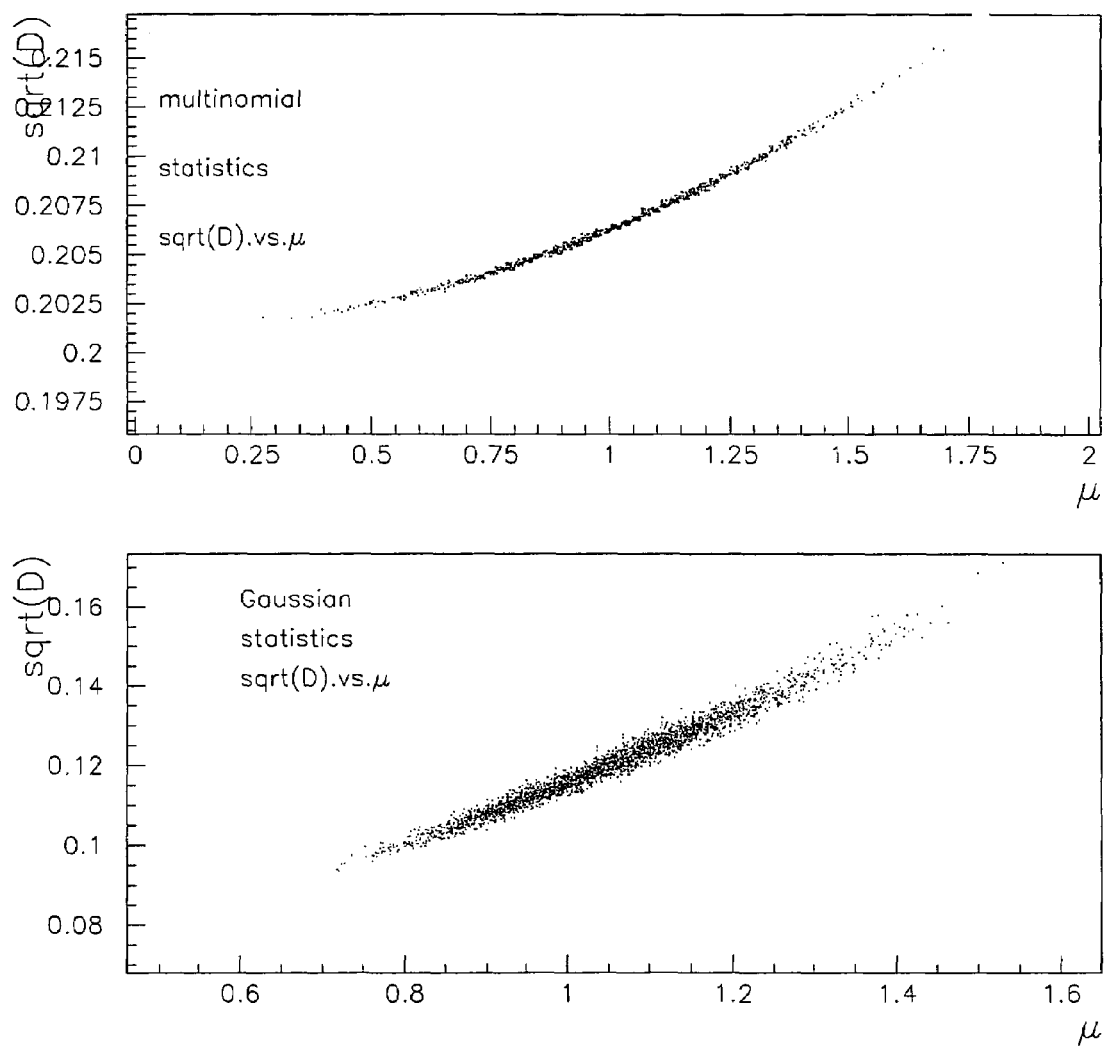
FIG. 1 is a graphical representation of the square root of D versus μ.

The present invention is directed to information analysis. More particularly, the invention provides a method wherein a goodness-of-fit parameter is developed and used to discriminate between biased and unbiased fits of data. The present invention achieves said discrimination between biased and unbiased fits by replacing a likelihood function with a probability of the likelihood function.

The present invention does not address the differences between various fitting methods, i.e. between a frequentist and Bayesian framework, but rather replaces a likelihood function L(y|α) with the probability of the likelihood W(L|α).

As noted above, the binned likelihood function L(y|α) is obtained by taking the product of the probabilities for each ordinate data point y, as a function of the fitting parameter(s) a and the abscissa value(s) x as shown in Equation 1:

$$L(y|\alpha) = \Pi_j P(y_j|\alpha, x_j) \quad (1)$$

wherein the index j runs over the data set (x,y) of dimension M. The index i runs over the α set of dimension $N_\alpha$. The true but unknown values for α are defined as the set $\alpha_o$ with the set γ defined as $\gamma = \alpha - \alpha_o$.

The probability P(y|α,x) is a function of two entities: the fitting function $f(\alpha, x_j)$, hereafter known as $f_j$ in the present invention, and the statistical function that predicts how the data will distribute around $f_j$, hereafter called the statistics. For Gaussian statistics the likelihood reads:

$$L(y \mid \alpha) = \prod_j \frac{1}{\sqrt{2\pi\sigma_j}} \exp\left(-\frac{1}{2}\frac{(y_j - f_j)^2}{\sigma_j^2}\right) \quad (2)$$

Maximization of L(y|α), or the maximization of a monotomic function of L(y|α) affords for the determination of set μ, which estimates the fitting parameters α. In the alternative, the first moments of the likelihood L(y|α) are used as an estimation for the set α.

The data fitting method taught in the present invention is:

$$P(\alpha \mid L) = \frac{W(L \mid \alpha)}{G} \quad (8)$$

wherein: W(L|α) is the probability of the likelihood, P(α|L) is the new posterior probability, G is the goodness-of-fit parameter, a is the set of fitting parameters, and L is the likelihood function.

A new set of estimators $w_I$, replacing μ, is determined for the parameter set α from the new posterior probability P(α|L) by maximization of P(α|L), or in the alternative from identification of the first moments of P(α|L). It is important to note that the set of estimators $w_I$ is distinct from the set μ, which is determined directly from the likelihood as taught above.

The new set of estimators for the variance of the set $w_I$, generally known as the covariance matrix for the parameter set α, is determined from the new posterior probability P(α|L), or equivalently from the probability of the likelihood function W(L|α), by differentiation as shown in Equation 10 or identification of the moments as shown in Equation 11.

$$V_{ik} = -\frac{\partial^2 \ln\{W(L \mid \alpha)\}}{\partial \alpha_i \partial \alpha_k} \qquad (10)$$

or $$\frac{1}{V_{ik}} = \frac{\int d\alpha_i d\alpha_k W(L \mid \alpha) \alpha_i \alpha_k}{\int d\alpha_i d\alpha_k W(L \mid \alpha)} - w_i w_k \qquad (11)$$

This set of estimators is distinct from the set $V_{ik}$ which is derived directly from the likelihood.

A goodness-of-fit parameter for all binned data is defined as G, or in the alternative as a quantity that is a monotomic function of G. However depending on the given data analysis operation, G may not be dimensionless. Therefore a simple transformation allows for a dimensionless probability-like quantity defined as $G^* = G/G_{max}$, where $G_{max}$ is the maximum value attainable by G. In the event that substantial prior information is available on the set of fitting parameters $\alpha$, Equation 7 reads:

$$P(\alpha \mid L) = \frac{W(L \mid \alpha) P(\alpha)}{G}. \qquad (9)$$

The goodness-of-fit parameter defined above in Equations 7 and 8 is mathematically distinct from prior art goodness-of-fit parameters. In a simple application involving a one parameter fit with Gaussian statistics, G can be expressed as the conditional probability integral:

$$G = \int P(\chi^2, \mu, D \mid \alpha) d\alpha \qquad (12)$$

In the event that a given probability of likelihood function can not be calculated exactly, likelihood functions that are differentiable to all orders are represented by an infinite but numerable set of quantities A. The set of quantities A can be the set of moments, the terms of a Taylor expansion, the expansion onto any orthonormal set of functions (Hilbert space) covering the parameter space or any other equivalent representation in function space. For illustrative purposes only, the chosen set of quantities A used hereafter is a function of $\mu$, the natural logarithm of the peak likelihood and the derivatives of the natural logarithm of the peak likelihood function.

Turning to FIG. 1, two scatter plots are shown wherein the relation of unbiased fits between $\mu$ and SORT(D) for multiracial and Gaussian statistics is illustrated. The inventive method of the present invention evaluates the probability that a given fit of data fails within the envelope described by one of the scatter plots, and enables the user to reject biased fits that fall outside the envelope.

It is important to note that the choice of A does not affect its dimensionality at any given order of the expansion. That is, there is a zero-order term, $N_\alpha$ first-order terms, $(N_\alpha+1)!(N_\alpha-1)!/2!$ second order terms, and $(N_\alpha+n+1)!(N_\alpha-1)!/n!$ terms at the order n. If all of the parameters are not of interest, with some of the parameters being "nuisance" parameters, a smaller set of A can is used rather than the full set obtained by truncation to the order n.

Given the nature of set A, i.e. the possibility of an infinite number of members of the set, A must be truncated at some order before the probability of the likelihood $W(L\mid\alpha)$ can be determined. The present invention determines the truncation at the order n by assuming a fitting precision quantity $\epsilon$ and the goodness-of-fit parameter obeying the following relation:

$$\frac{|G_n^* - G_{n-1}^*|}{G_n^*} < \varepsilon \qquad (13)$$

Using the present invention, Equation 7 is transformed to:

$$P(\alpha \mid A) = \frac{W(A \mid \alpha)}{G} \qquad (14)$$

wherein using Bayes' theorem $W(A\mid\alpha)$ is expressed as a product of the conditional probabilities:

$$W(A\mid\alpha) = P(A_1\mid\alpha)P(A_2\mid A_1,\alpha)P(A_3\mid A_1, A_2, \alpha) \qquad (15)$$

Numerical and Analytical Solutions

Using the above disclosed principles a method of solution follows for the previously chosen set. First, the likelihood is determined assuming a one parameter fit with the set A consisting of $A_1=\mu$, $A_2=-2 \ln L_{max}=\chi^2$, and $A_3=D$. Equation 15 is now expressed as:

$$W(A\mid\alpha) = P(\mu\mid\alpha)P(\chi^2\mid\mu,\alpha)P(D\mid\mu,\chi^2,\alpha) \qquad (16)$$

wherein each probability is computed separately in order to obtain $\alpha$. A numerical solution can always be determined using a Monte Carlo simulation. In the alternative, an analytical solution exists for Gaussian statistics. Furthermore, in the limit of a large number of data points, all statistics converge to Gaussian.

For a multi-parameter fit and assuming Gaussian statistics, the first $N_\alpha$ elements $A_1, A_2, A_3 \ldots A_{N\alpha}$ are the set $\mu$. The next element is $\chi^2$, with the next being the $(N_\alpha+1)!(N_\alpha-1)!/2!$ subset of the derivatives $\partial^2 \ln L/\partial\alpha_j\partial\alpha_k$ evaluated at $\mu$, etc., up to the chosen order at which the series is truncated.

The substitutions shown below in Equations 17-23 are used to introduce dimensionless random variables of the set r which are distributed according to a Gaussian distribution centered at zero with unit width, which is defined to be the [0,1] Gaussian.

$$r_j = \frac{y_j - f(x_j, \mu)}{\sigma_j} \qquad (17)$$

$$f'_{ji} = \frac{1}{\sigma_j}\frac{\partial f_j(x_j, \mu)}{\partial \alpha_i} \qquad (18)$$

$$f''_{ji} = \frac{1}{\sigma_j}\frac{\partial^2 f_j(x_j, \mu)}{\partial \alpha_i^2} \qquad (19)$$

$$f''_{jik} = \frac{1}{\sigma_j}\frac{\partial^2 f_j(x_j, \mu)}{\partial \alpha_i \partial \alpha_k} \qquad (20)$$

$$f'''_{jik} = \frac{1}{\sigma_j}\frac{\partial^3 f_j(x_j, \mu)}{\partial \alpha_i \partial \alpha_k^2} \qquad (21)$$

-continued $$f'''_{ji} = \frac{1}{\sigma_j}\frac{\partial^3 f_j(x_j,\mu)}{\partial \alpha_i^3} \quad (22)$$

$$f'''_{jikl} = \frac{1}{\sigma_j}\frac{\partial^3 f_j(x_j,\mu)}{\partial \alpha_i \partial \alpha_k \partial \alpha_l} \quad (23)$$

Various properties of the probability of linear and quadratic transformations of the set r are shown in Equations 24-30 with all sums over 1, ..., M. By using the [ ] convention to define a Gaussian, these properties are expressed as:

$$P\left(\sum r_j\right) = \lfloor 0, \sqrt{M}\rfloor \quad (24)$$

$$P(Kr) = [0, K] \quad (25)$$

$$P\left(\sum s_j r_j\right) = \lfloor 0, \sqrt{\sum s_j^2}\rfloor \quad (26)$$

$$P\left(\sum s_j + t_j r_j\right) = \lfloor \sum s_j, \sqrt{\sum t_j^2}\rfloor \quad (27)$$

$$P\left(\sum r_j^2\right) = P(\chi^2 M) \quad (28)$$

$$\rho\left(\sum s_j r_j, \sum r_j^2\right) = 0 \quad (29)$$

$$\rho\left(\sum s_j r_j, \sum t_j r_j\right) = \frac{s \cdot t}{\sqrt{\sum s_j^2}\sqrt{\sum t_j^2}} \quad (30)$$

Equations 24-27 show the linear transformations of the set r are distributed as a Gaussian of width specified by the right hand side of the equation, with s and t constant vectors of dimension equal to y. In addition, Equation 28 demonstrates that the sum of the r squared elements follows a $\chi^2$ distribution with M degrees of freedom, Equation 29 shows a zero correlation between the quadratic and linear functions of the set r, and Equation 30 provides the correlation coefficients between any two linear functions of the set r.

Regarding the Taylor expansion of $-2 \ln L$ around $\mu$, the following expression:

$$-2\ln L(\alpha|\mu)=\Sigma_j r_j^2+\Sigma_j\Sigma_i b_{ji}\gamma_i^2+\Sigma_j\Sigma_i\Sigma_k c_{jik}\gamma_i\gamma_k+\Sigma_j\Sigma_i e_{ji}\gamma_i^3+ \\ \Sigma_j\Sigma_i\Sigma_k h_{jik}\gamma_i\gamma_k^2+\Sigma_j\Sigma_i\Sigma_k\Sigma_l q_{jikl}\gamma_i\gamma_k\gamma_l r+ \quad (31)$$

applies when the indices i, k, l, ..., which run from 1, ..., $N_\alpha$ appear together and the condition $i \neq k \neq l$ is satisfied. Then the terms b, c, e, h, q, ... can be expressed as:

$$b_{ji}=f'_{ji}{}^2-f''_{ji}r_j \quad (32)$$

$$c_{jik}=2(f'_{ji}f'_{jk}-f''_{jik}r_j) \quad (33)$$

$$e_{ji}=2(f'_{ji}f''_{ji}-(\tfrac{1}{6})f'''_{ji}r_j) \quad (34)$$

$$h_{jik}=2(f'_{ji}f''_{jk}+(\tfrac{1}{2})f'_{ji}f''_{jik}-(\tfrac{1}{2})f'''_{jik}r_j) \quad (35)$$

$$q_{jikl}=2(f'_{ji}f''_{jkl}-f'''_{jikl}r_j) \quad (36)$$

whereupon all terms to all orders are seen to be of the form:

$$b_{ji}=b_{0ji}-b_{1ji}r_j \quad (37)$$

The set $b_{ij}$ is then summed over the data index j in order to determine the sets B, C, E, H, Q, ...

$$B_i=\Sigma_j b_{ji} \quad (38)$$

with Equation 26 showing that the probability distribution for each member of the sets B, C, E, H, Q, ... is Gaussian. For example:

$$P(B_i)=\lfloor \Sigma b_{0ji}, \sqrt{\Sigma b_{1ji}^2}\rfloor \quad (39)$$

The determination of the set A then follows as:

$$A_{1,\ldots,N\alpha}=\mu \quad (40)$$

$$A_{N\alpha+1}=\chi^2 \quad (41)$$

$$A_{N\alpha+1,\ldots,2N\alpha+1}=B \quad (42)$$

$$A_{2N\alpha+2\ldots(N\alpha+1)(N\alpha+2)/2}=C \quad (43)$$

where the correlation between any two members of the set A is given by Equation 28 or Equation 29.

After set A has been determined, the introduction of a set A' assists in the deriving the final formula for W(A|α), where A' is defined as the set A minus the $\chi^2$, which allows all the members of set A' to have the form:

$$A'_k=A'_{0k}+A'_{1k} \quad (44)$$

wherein similar to Equation 36, $A'_{0k}$ is a fixed quantity computed from $\mu$ and $f_i$ and $A'_{1k}$ a quantity with a known Gaussian distribution. The covariance matrix is then defined as:

$$V_{lm}=\Sigma_j f_j^l f_j^m \quad (45)$$

wherein a determinant v=det[V] and the quantities $f^l$ are defined as the vectors that multiply the random set $r_j$ in the definition of the quantity $A'_l$. For example, from Equations 33 and 34 the elements of A' derived for the E and H quantities are:

$$f_j^l=(\tfrac{1}{3})f'''_{ji} \text{ for } E, \quad (45)$$

$$f_j^l=f'''_{jik} \text{ for } H, \quad (46)$$

and likewise for the other members of A'. Thus having defined the covariance matrix V and the set A', the probability of the likelihood can be expressed as:

$$W(A|\alpha) = P(\chi^2|M)\frac{1}{(2\pi)^{M/2}v^{1/2}}\exp(-1/2)(A'-A'_0)^T V^{-1}(A'-A'_0) \quad (47)$$

wherein $V^{-1}$ is derived from $VV^{-1}=I$.

Having determined the above, $G_{max}$ is then determined to be equal to the maximum $P(\chi^2|M)$ times the peak value of the multivariant Gaussian that describes the distribution of all the other members of the set A. Assuming A has an overall dimension of K, $G_{max}$ obeys the following expression:

$$G_{max} = \frac{1}{(2\pi)^{(K-1)/2}v^{1/2}}\frac{1}{2^{M/2}\Gamma(M/2)}\frac{(M-2)^{M/2-1}}{e^{M-2}} \quad (48)$$

wherein $\Gamma(x)$ is the Gamma function.

In the alternative, if the method of solution is chosen to be in the form of a simulation, histograms of the distribution of the simulation results over the set A are constructed. The basic unit of a histogram is a bin and $G_{max}$ is proportional to the population of the most populated bin of the simulated distribution of space A. In addition, $G/G_{max}$ is determined from the ratio of the population of the bin in A space were the fit is located divided by the population of the maximum bin.

While the classical $\chi^2$ method compares the actual value of $\chi^2$ against an expected $P(\Sigma r^j{}_2, M-N_\alpha)$ effectively testing only the quadratic sum $\Sigma r^j{}_2$, the method of the present invention also tests a weighted linear sum, for example per Equations 37 and 38 $A_i = \Sigma \alpha_{ji} r_j$, with the set a known. Therefore, the method of the present invention uses new information to evaluate the goodness-of-fit parameter and in this manner provides an unexpected improvement in the statistical analysis of data. It is also important to note that each new quantity $A_i$ except for $\chi^2$ and $\mu$, is uncorrelated to $\chi^2$ such that $P(\chi^2, A_i) \propto P(\chi^2) P(A_i)$. However, the new quantities of $A_i$ are distributed according to a multidimensional Gaussian distribution with a known covariance matrix.

Application

Figure 2:
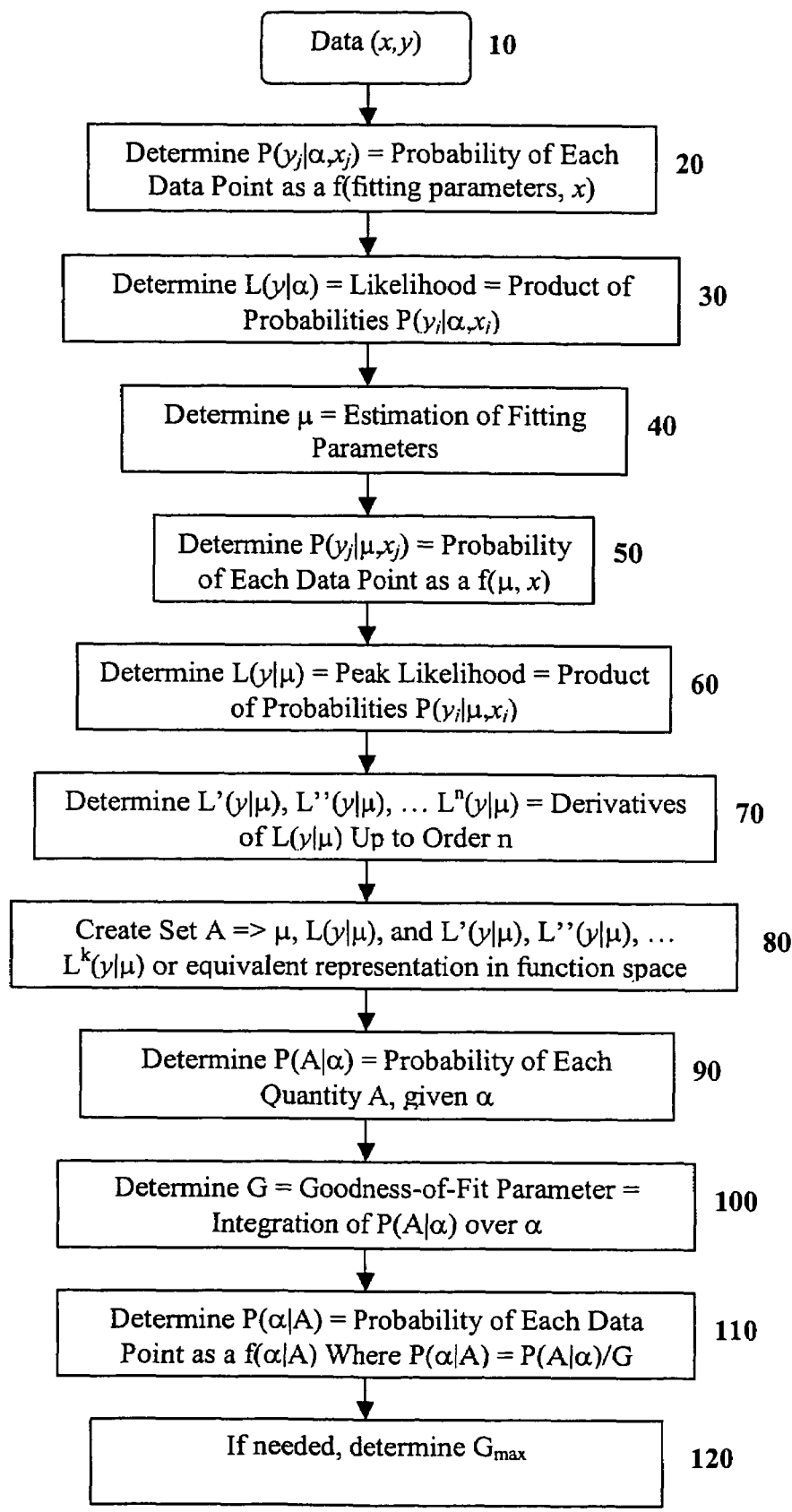
FIG. 2 is flowchart describing an embodiment of the present invention.

Using the method of the present invention, the steps involved in one embodiment are shown in FIG. 2. First, the probability of data obtained in step 10 is determined at step 20 with said probability of each data point being a function of a fitting parameter $\alpha$ and the abscissa value $x_j$. Thereafter the binned data likelihood is determined (step 30) by taking the product of the probabilities determined in step 20. After the binned data likelihood has been determined, a first set of values $\mu$, is determined as that set of values which afford a maximum value for the binned likelihood function (step 40). Following step 40, the probability of each data point as a function of $\mu$ and the abscissa value is determined at step 50. At step 60, the peak likehhood is determined by taking the product of the probabilities determined in step 50. After the peak likelihood is determined, the derivatives of said likelihood function are determined up to the $n^{th}$ order in step 70. In the alternative, the derivatives of a monotomic function of the peak likelihood function up to the $n^{th}$ order may be determined or some equivalent representation in function space. For the purpose of the present invention, the term representation of the likelihood (or a monotomic function of the likelihood) in function space is defined as choosing one of many methods to reduce said likelihood (or said monotomic function of said likelihood) to an infinite set of numbers. For illustrative purposes only, such a representation can be executed using a Taylor series, the determination of moments or a decomposition in Hilbert space.

At step 80 a second set of values which characterizes the likelihood function in step 60 and hereinafter noted as A, is determined. After the creation of set A, the probability of each data point as a function of set A and $\alpha$ is determined (step 90). Thereafter a goodness-of-fit parameter is determined by integrating $P(A|\alpha)$ over a (step 100). Thereafter the probability of each data point as a function of $\alpha$ and set A is determined (step 110), wherein $P(\alpha|A)$ is equal to the probability determined in step 90 divided by the goodness-of-fit parameter determined in step 100. If needed, $G_{max}$ is determined using an analytical solution, for example Equation 48, or in the alternative using a simulation technique in step 120.

If the above-described method is performed using analytical solutions, then appropriate algorithms can be used and values determined. However, if simulation methods are used, appropriate simulation techniques must be employed in order to obtain satisfactory results. For example, enough experiments or data points represented by N are taken such that N is greater than the number $1/\epsilon^2$ wherein $\epsilon$ is a small quantity less than 1 determined by the user.

EXAMPLES

For illustrative purposes only, two examples are provided wherein the method of the present invention is employed. The first example considers a 2-parameter biased fit germane to statistical analysis in financial markets where multi-parameter fits must be executed using strongly correlated parameters.

The fitting function for this example is:

$$f(x, \alpha_1, \alpha_2) = \frac{1}{2}\left(e^{-\alpha_1 x} + e^{-\alpha_2 x^2/2}\right) \tag{51}$$

where $\alpha_1$ is the parameter of interest and $\alpha_{01}=1$. The parameter $\alpha_2$ takes into account other spurious effects and is a nuisance parameter. The true function that generates the data is taken as:

$$t(x) = \frac{1}{2}\left(e^{-x} + \frac{1}{1+x^2}\right) \tag{52}$$

Typically the effect of a parameter is modeled precisely but a bias is developed due to nuisance parameters. This example is just such a case. Herein, G is evaluated explicitly using Equations 38-45 and is computed to the second order ($G$ in FIG. 3B. $G^{*2}$ in FIG. 3C) since the mixed ($\alpha_1, \alpha_2$) derivatives are zero and set A has dimension seven. In addition, G is also computed to the third order ($G^{*3}$ in FIG. 3C), with the set A having dimension nine, in order to control the rate of convergence.

Figure 3A:
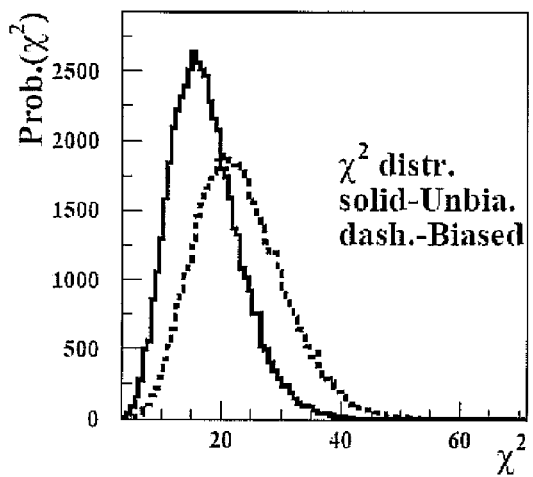
FIG. 3A is a graphical representation of biased and unbiased fits using Gaussian statistics and a $\chi^2$ distribution.
Figure 3B:
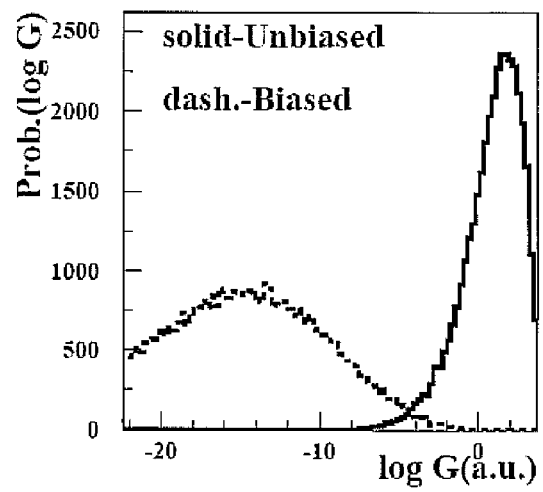
FIG. 3B is a graphical representation of biased and unbiased fits using Gaussian statistics and a G distribution.
Figure 3C:
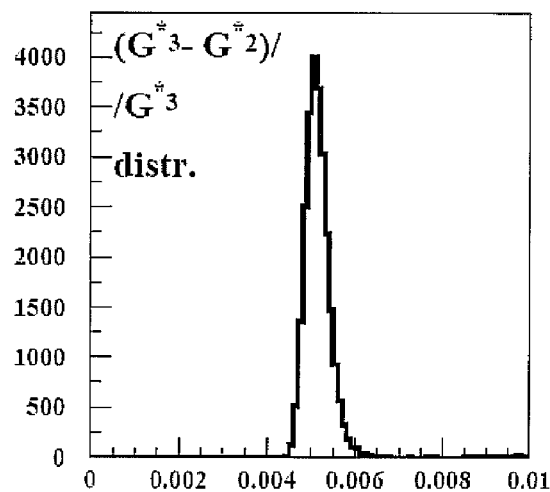
FIG. 3C is a graphical representation of the variation of G* when using a second order A set versus a third order A set.

The results for executing 50,000 simulated fits using 20 data points equally spaced in the interval [0,2] and an error for each data point being $\sigma_j \sim 0.06 y_i$ are shown in FIG. 3A-3C. The biased and unbiased $\chi^2$ distributions are similar with little separation exhibited in the FIG. 3A. Using a high $\chi^2$ cut such that 10% of the unbiased experiments are discarded, approximately 25% of the biased experiments are eliminated. However, using the method of the present invention, FIG. 3B shows that a 10% cut of the unbiased experiments results in approximately 95% of the biased fits being discarded and therein a more accurate determination between biased and unbiased fits. FIG. 3C is included to show that the change in G* is of the order of 0.005 when it is computed to the second order as opposed to when it is computed to the third order. This plot thus confirms the rapid convergence of the method used in the present invention, which in turn makes the method of practical use.

The second example shown in FIGS. 4A-4D provide an illustrative example of the evaluation of G using Monte Carlo methods. In this example a multiracial statistics, ubiquitous to file life sciences, is used. The true functions is $t(x)=(b\ 1-x)^{1/2}$ in the interval [0,1] using ten bins and is fitted with the expression $f(x,\alpha)=e^{-\alpha x}$.

Figure 4A:
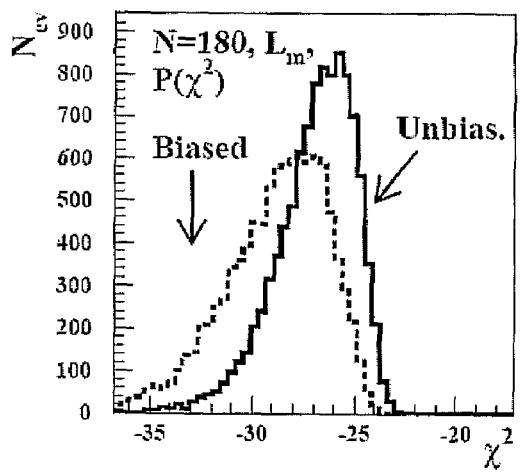
FIG. 4A is a graphical representation of biased and unbiased fits using the Monte Carlo method and a $\chi^2$ distribution with N=180.
Figure 4B:
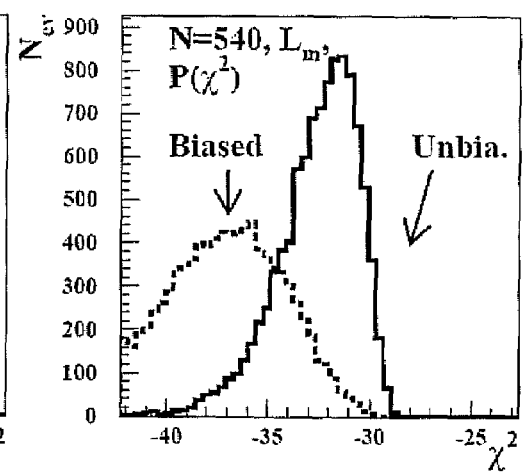
FIG. 4B is a graphical representation of biased and unbiased fits using the Monte Carlo method and a $\chi^2$ distribution with N=540.
Figure 4C:
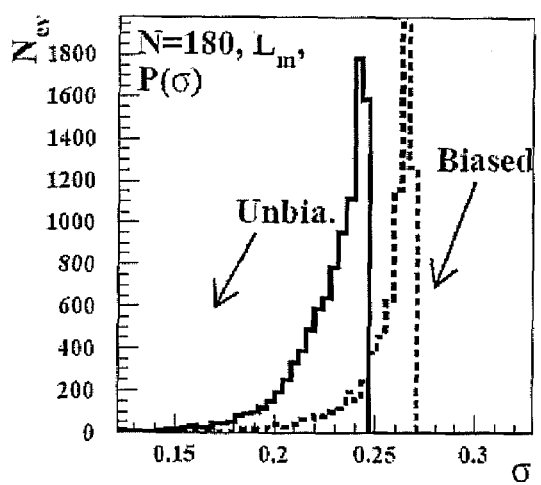
FIG. 4C is a graphical representation of biased and unbiased fits using the Monte Carlo method and a $\sqrt{D}$ distribution with N=180.
Figure 4D:
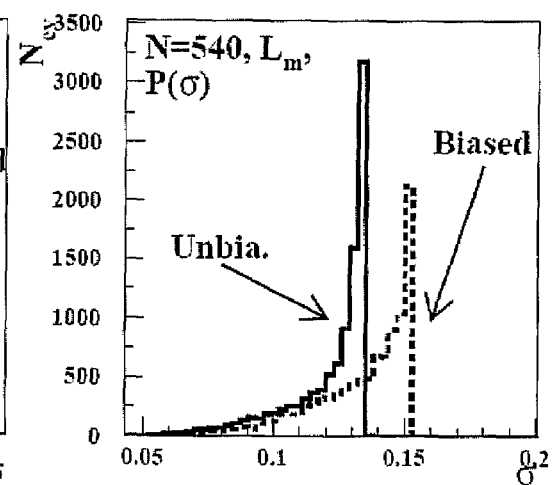
FIG. 4D is a graphical representation of biased and unbiased fits using the Monte Carlo method and a $\sqrt{D}$ distribution with N=540.

Similar to the first example, the $\chi^2$ distributions shown in FIG. 4A (N=180) and FIG. 4B (N=540) do not provide an adequate separation between the biased and unbiased fits. In contrast, plots developed using the method of the present invention and shown in FIGS. 4C and 4D provide a significant and distinct separation between the biased and unbiased fits and therein a more accurate determination between biased and unbiased fits.

The invention is not restricted to the illustrative examples described above. The examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. A method for discriminating between a biased fit of data and an unbiased fit of data using a probability function, a binned likelihood function, a peak likelihood function, a set of fitting parameters, a goodness-of-fit parameter, and a fitness precision, the method comprising the steps of:
   collecting data;
   determining a first set of probabilities for each ordinate data point of said collected data as a function of the fitting parameters and the abscissa value;
   determining the binned data likelihood by taking the product of said first set of probabilities;
   determining a first set of values, said first set of values estimating the set of fitting parameters affording a maximum value of the binned likelihood function;
   determining a second set of probabilities for each ordinate data point as a function of said first set of values and the abscissa value for each data point of said collected data;
   determining a peak likelihood by taking the product of said second set of probabilities;
   determining a representation of said peak likelihood in function space;
   forming a second set of values, said second set of values comprised of said first set of values, the peak likelihood and said representation of said peak likelihood in function space;
   determining a third set of probabilities for each data point as a function of said first set and said second set of values;
   determining a goodness-of-fit parameter by integrating said third set of probabilities over said second set of values; and
   determining a maximum goodness-of-fit parameter, said maximum goodness-of-fit parameter being the maximum value attainable by said goodness-of-fit parameter, wherein the ratio of the goodness-of fit parameter to the maximum goodness-of fit parameter is less than the fitness precision, for the purpose of discriminating between biased and unbiased fits of data.

2. The method of claim 1, wherein said representation is the derivatives of a monotomic function of the peak likelihood function up to an $n^{th}$ order.

3. The method of claim 1, wherein said representation is the derivatives of a natural logarithm of the peak likelihood function up to an $n^{th}$ order.

4. The method of claim 1, wherein the method is executed using a machine.

5. The method of claim 1, further comprising determining a graphical image of one or more probability of likelihood values.

6. The method of claim 1, wherein the data collected comprises data from the economy.

7. The method of claim 1, wherein the data collected comprises data from the life sciences.

8. The method of claim 1, wherein said first set of values estimates the set of fitting parameters affording a maximum value of a monotomic function of the binned likelihood function.

9. The method of claim 8, wherein said monotomic function is a natural logarithm.

10. The method of claim 1, wherein said first set of values estimates the set of fitting parameters affording a minimum value of the negative of a monotonic function of the binned likelihood function.

11. The method of claim 10, wherein said monotomic function is a natural logarithm.

12. A method for discriminating between a biased fit of data and an unbiased fit of data using a probability function, a binned likelihood function, a peak likelihood function, a set of filling parameters, a goodness-of-fit parameter, and a filling precision, the method comprising the steps of:
   collecting data;
   determining a first set of probabilities for each ordinate data point as a function of the filling parameters and the abscissa value;
   determining the binned data likelihood by taking the product of said first set of probabilities;
   determining a first set of values, said first set estimating the set of fitting parameters affording a maximum value of the binned likelihood function;
   determining a second set of probabilities for each ordinate data point as a function of said first set of values and the abscissa value;
   determining a peak likelihood by taking the product of said second set of probabilities;
   determining the moments of the peak likelihood function up to a $n^{th}$ order; forming a second set of values, said second set of values comprised of said first set of values, the peak likelihood and at least the set of second said moments of the peak likelihood function;
   determining a third set of probabilities for each data point as a function of said first set and said second set of values;
   determining a goodness-of-fit parameter by integrating said third set of probabilities over said second set of values; and
   determining a maximum goodness-of-fit parameter, said maximum goodness-of-fit parameter being the maximum value attainable by said goodness-of-fit parameter, wherein the ratio of the goodness-of-fit parameter to the maximum goodness-of-fit parameter is less than the fitness precision for the purpose of discriminating between biased and unbiased fits of data.

13. The method of claim 12, wherein said first set of values estimates the set of fitting parameters affording a minimum value of the negative of a monotomic function of the binned likelihood function.

14. The method of claim 12, wherein the method is executed using a machine.

15. The method of claim 12, further comprising determining a graphical image of one or more probability of likelihood values.

16. The method of claim 12, wherein the data collected comprises data from the economy.

17. The method of claim 12, wherein the data collected comprises data from the life sciences.

18. The method of claim 12, wherein said first set of values estimates the set of fitting parameters affording a maximum value of a monotomic function of the binned likelihood function.

19. The method of claim 13, wherein said monotomic function is a natural logarithm.

* * * * *

UNITED STATES PATENT AND TRADEMARK OFFICE
CERTIFICATE OF CORRECTION

PATENT NO. : 7,324,925 B2 Page 1 of 1
APPLICATION NO. : 11/416680
DATED : January 29, 2008
INVENTOR(S) : Giovanni Bonvicini It is certified that error appears in the above-identified patent and that said Letters Patent is hereby corrected as shown below:

Column 10, line 54, replace "multiracial" with --multinominal--

Column 12, line 14, replace "filling" with --fitting--

Column 12, line 28, delete "forming a second set of values, said"

Column 12, line 29, before "second" insert --forming a second set of values, said--

Signed and Sealed this

Eleventh Day of November, 2008

JON W. DUDAS
*Director of the United States Patent and Trademark Office*